(12) United States Patent
Kawarada et al.

(10) Patent No.: US 9,609,163 B2
(45) Date of Patent: Mar. 28, 2017

(54) IMAGE CAPTURING DEVICE, COLOR MEASUREMENT APPARATUS, AND IMAGE FORMING APPARATUS

(71) Applicants: Masaya Kawarada, Kanagawa (JP); Nobuyuki Satoh, Kanagawa (JP); Mamoru Yorimoto, Kanagawa (JP); Kenji Morita, Tokyo (JP); Masahiro Hiranuma, Kanagawa (JP); Daisaku Horikawa, Kanagawa (JP)

(72) Inventors: Masaya Kawarada, Kanagawa (JP); Nobuyuki Satoh, Kanagawa (JP); Mamoru Yorimoto, Kanagawa (JP); Kenji Morita, Tokyo (JP); Masahiro Hiranuma, Kanagawa (JP); Daisaku Horikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/853,100

(22) Filed: Sep. 14, 2015

(65) Prior Publication Data

US 2016/0080610 A1    Mar. 17, 2016

(30) Foreign Application Priority Data

Sep. 16, 2014    (JP) ................................. 2014-188311

(51) Int. Cl.
*H04N 1/00* (2006.01)
*H04N 1/60* (2006.01)
*H04N 1/034* (2006.01)

(52) U.S. Cl.
CPC ........... *H04N 1/034* (2013.01); *H04N 1/6044* (2013.01); *H04N 2201/0005* (2013.01)

(58) Field of Classification Search
None
See application file for complete search history.

(56) References Cited

U.S. PATENT DOCUMENTS

| 5,216,481 A * | 6/1993 | Minato .............. G01N 21/9036 250/223 B |
| 2012/0069411 A1 | 3/2012 | Satoh et al. |

(Continued)

FOREIGN PATENT DOCUMENTS

| JP | 2013-224924 | 10/2013 |
| JP | 2013-228368 | 11/2013 |

OTHER PUBLICATIONS

U.S. Appl. No. 14/565,182, filed Dec. 9, 2014.
(Continued)

*Primary Examiner* — Dov Popovici
(74) *Attorney, Agent, or Firm* — Oblon, McClelland, Maier & Neustadt, L.L.P.

(57) ABSTRACT

An image capturing device includes: a two-dimensional image sensor that captures an image of a predetermined image capture area including a subject; a light source that illuminates the image capture area; and a light blocking member that blocks light traveling from the light source toward a specular reflection position, the specular reflection position being a position that is in the image capture area and where, if light travels from the light source, the light would be specularly reflected to the two-dimensional sensor. The light blocking member is arranged outside the image capture area.

9 Claims, 14 Drawing Sheets

(56) References Cited

U.S. PATENT DOCUMENTS

| | | |
|---|---|---|
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1* | 8/2013 | Satoh .................... G01J 3/462 |
| | | 358/1.9 |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258368 A1 | 10/2013 | Shigemoto et al. |
| 2013/0258369 A1 | 10/2013 | Suzuki et al. |
| 2014/0218754 A1 | 8/2014 | Satoh et al. |
| 2015/0070737 A1 | 3/2015 | Hirata et al. |
| 2015/0085305 A1 | 3/2015 | Suzuki et al. |
| 2015/0109646 A1 | 4/2015 | Yokozawa et al. |
| 2015/0146053 A1 | 5/2015 | Satoh et al. |
| 2015/0158309 A1 | 6/2015 | Fujii et al. |
| 2015/0162372 A1 | 6/2015 | Yorimoto et al. |

OTHER PUBLICATIONS

U.S. Appl. No. 14/789,015, filed Jul. 1, 2015.
U.S. Appl. No. 14/753,729, filed Jun. 29, 2015.
U.S. Appl. No. 14/851,383, filed Sep. 11, 2015.

* cited by examiner

IMAGE CAPTURING DEVICE, COLOR MEASUREMENT APPARATUS, AND IMAGE FORMING APPARATUS

CROSS-REFERENCE TO RELATED APPLICATIONS

The present application claims priority to and incorporates by reference the entire contents of Japanese Patent Application No. 2014-188311 filed in Japan on Sep. 16, 2014.

BACKGROUND OF THE INVENTION

1. Field of the Invention

The present invention relates to an image capturing device, a color measurement apparatus, and an image forming apparatus.

2. Description of the Related Art

Color measurement apparatuses that measure colors of patterns (patches), which are formed on a recording medium by an image forming apparatus using coloring material such as ink, by capturing an image of the patterns using a two-dimensional (2D) image sensor to obtain RGB values of the patterns and converting the RGB values into colorimetric values (color measurement values) in a standard color space are conventionally known. An example of such a color measurement apparatus is known from Japanese Laid-open Patent Application No. 2013-224924.

However, color measurement apparatuses of this type can suffer from a problem that, if light specularly reflected off an image capture area of the 2D image sensor impinges on the 2D image sensor, the 2D image sensor can capture an image undesirably including a defective image created by the specularly reflected light, which can exert a negative effect on color measurement of patterns. To alleviate this problem, the color measurement apparatus disclosed in Japanese Laid-open Patent Application No. 2013-224924 arranges, at a position directly under an illumination light source, a diffusing plate that diffuses light emitted from the illumination light source in directions other than toward a 2D image sensor, thereby preventing light specularly reflected off an image capture area of the 2D image sensor from impinging on the 2D image sensor.

However, a color measurement apparatus configured to diffuse light emitted from an illumination light source with a diffusing plate arranged at a position directly under the illumination light source as in the color measurement apparatus disclosed in Japanese Laid-open Patent Application No. 2013-224924 can suffer from a problem that bright reflection light reflected from ridgelines of the diffusing plate impinges on the 2D image sensor and exerts a negative effect on color measurement of patterns.

SUMMARY OF THE INVENTION

It is an object of the present invention to at least partially solve the problems in the conventional technology.

An image capturing device includes: a two-dimensional image sensor that captures an image of a predetermined image capture area including a subject; a light source that illuminates the image capture area; and a light blocking member that blocks light traveling from the light source toward a specular reflection position, the specular reflection position being a position that is in the image capture area and where, if light travels from the light source, the light would be specularly reflected to the two-dimensional sensor. The light blocking member is arranged outside the image capture area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. An image forming apparatus according to an embodiment of the present invention described below is embodied in a serial-head inkjet printer. However, the present invention may be embodied in a wide variety of image forming apparatuses that form an image on a recording medium.

Mechanical Structure of Image Forming Apparatus

Figure 1:
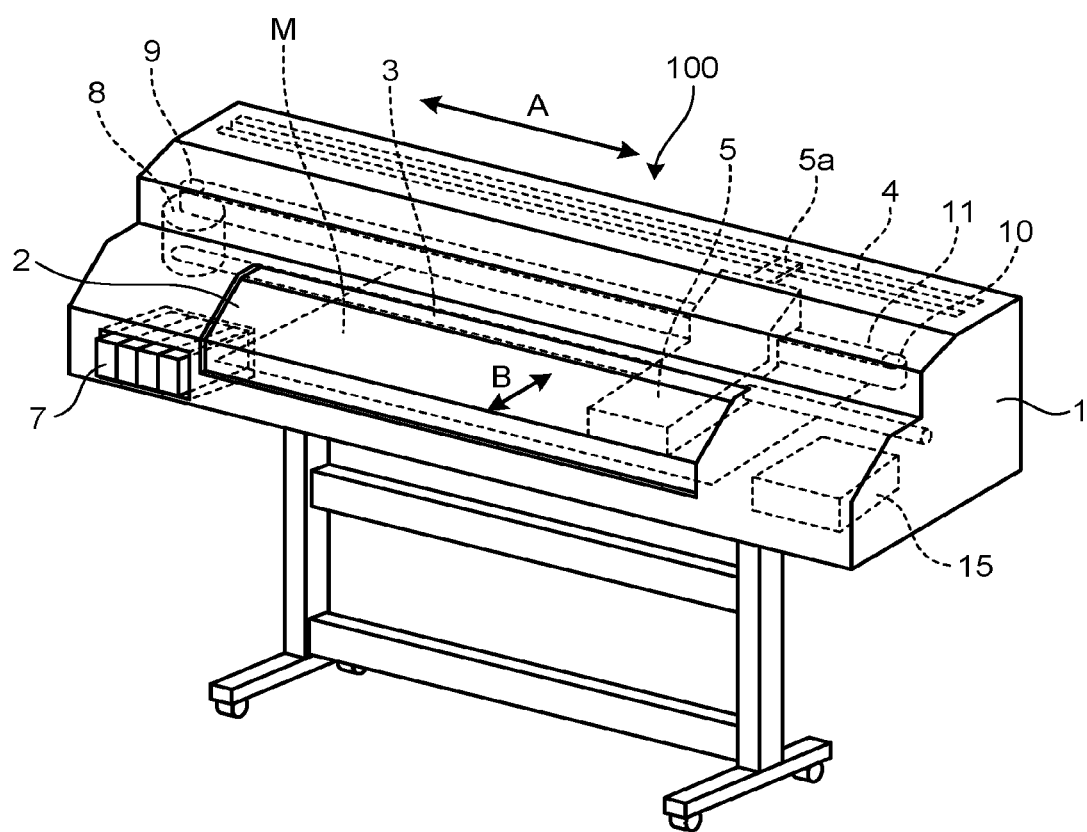
FIG. 1 is a perspective view transparently illustrating interior of an image forming apparatus.
Figure 2:
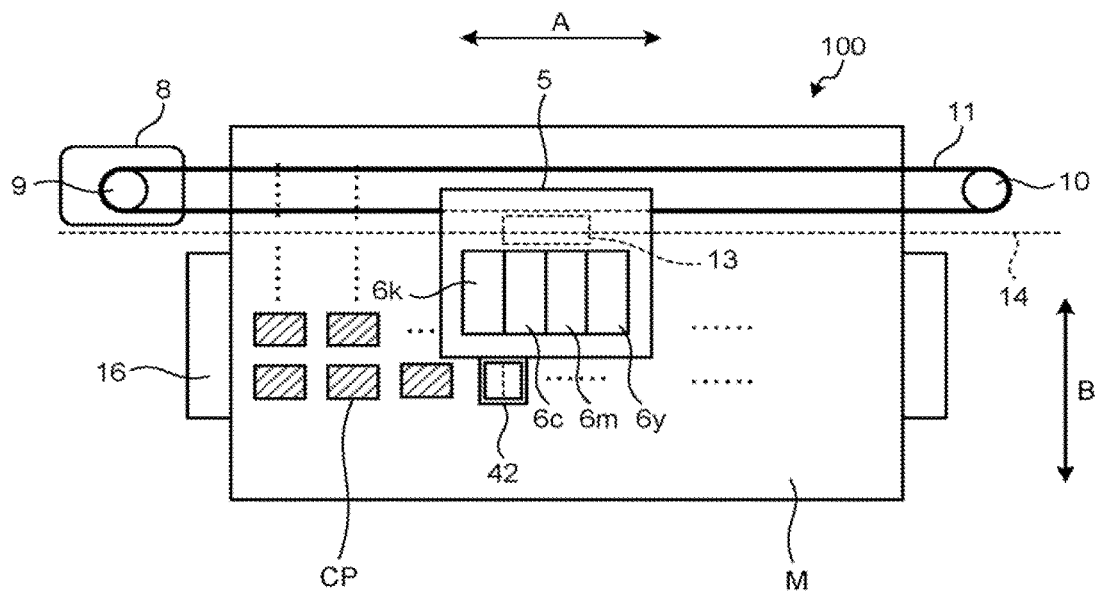
FIG. 2 is a top view illustrating an internal mechanical structure of the image forming apparatus.
Figure 3:
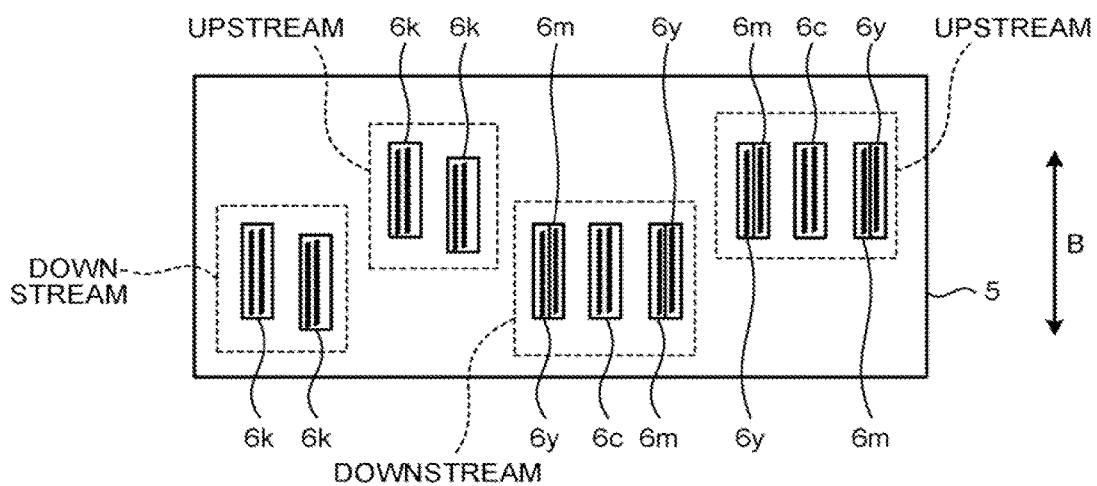
FIG. 3 is an explanatory diagram of an example layout of print heads mounted on a carriage.

A mechanical structure of an image forming apparatus 100 according to the embodiment is described below with reference to FIGS. 1 to 3. FIG. 1 is a perspective view transparently illustrating interior of the image forming apparatus 100. FIG. 2 is a top view illustrating an internal mechanical structure of the image forming apparatus 100. FIG. 3 is an explanatory diagram of an example layout of print heads 6 mounted on a carriage 5.

As illustrated in FIG. 1, the image forming apparatus 100 according to the embodiment includes the carriage 5 that reciprocates in the main-scanning direction (the direction indicated by arrows A in FIGS. 1 and 2). The carriage 5 is supported on a main guide rod 3 extending along the main-scanning direction. A connecting piece 5a is disposed on the carriage 5. The connecting piece 5a is engaged with a sub guide member 4 disposed parallel to the main guide rod 3, thereby stabilizing the orientation of the carriage 5.

As illustrated in FIG. 2, for example, four print heads 6y, 6m, 6c, and 6k are mounted on the carriage 5. The print heads 6y eject yellow ink. The print heads 6m eject magenta ink. The print heads 6c eject cyan ink. The print heads 6k eject black ink. Hereinafter, the print heads 6y, 6m, 6c, and 6k may be collectively referred to as the print heads 6. Each of the print heads 6 is supported on the carriage 5 with an ink ejection surface facing downward (toward a recording medium M).

Cartridges 7, which are ink suppliers for supplying ink to the print heads 6, are not mounted on the carriage 5 but arranged at a predetermined position in the image forming apparatus 100. The cartridges 7 and the print heads 6 are connected with pipes (not shown), via which ink is supplied from the cartridges 7 to the print heads 6.

The carriage 5 is coupled to a timing belt 11 wrapped around a driving pulley 9 and a driven pulley 10 in a tensioned manner. The driving pulley 9 is rotated by a main-scanning motor 8. The driven pulley 10 having a mechanism for adjusting the distance between the driving pulley 9 and the driven pulley 10 serves to apply a predetermined tension to the timing belt 11. The carriage 5 is reciprocated in the main-scanning direction by the timing belt 11 when the timing belt 11 is rotationally fed by the main-scanning motor 8. Traveling of the carriage 5 in the main-scanning direction is controlled based on an encoder value obtained from an output, which is output upon detecting a marker provided on an encoder sheet 14, of an encoder sensor 13 mounted on the carriage 5 as illustrated in FIG. 2, for example.

The image forming apparatus 100 according to the embodiment includes a maintenance mechanism 15 for maintaining reliability of the print heads 6. The maintenance mechanism 15 performs cleaning and capping of the ejection surfaces of the print heads 6, ejection of unnecessary ink from the print heads 6, and the like.

As illustrated in FIG. 2, a platen 16 is arranged at a position facing the ejection surfaces of the print heads 6. The platen 16 is provided to support the recording medium M when the print heads 6 eject ink onto the recording medium M. The image forming apparatus 100 according to the embodiment is of a wide type where reciprocating stroke of the carriage 5 in the main-scanning direction is long. For this reason, the platen 16 is formed by joining a plurality of plate members in the main-scanning direction (the direction in which the carriage 5 travels). The recording medium M is pinched between conveying rollers driven by a sub-scanning motor (not shown) and intermittently conveyed on the platen 16 in the sub-scanning direction (which is the direction perpendicular to the main-scanning direction) indicated by arrows B in FIGS. 1 to 3.

The print heads 6 include a plurality of nozzle arrays and form an image on the recording medium M by ejecting ink from the nozzle arrays onto the recording medium M conveyed on the platen 16 (image forming unit). In the embodiment, the upstream print heads 6 and the downstream print heads 6 are arranged on the carriage 5 as illustrated in FIG. 3 to ensure the width of an image that can be formed on the recording medium M in scanning of the carriage 5 in one time. The number of the print heads 6k that eject black ink arranged on the carriage 5 is twice as many as each of the print heads 6y, 6m, and 6c that eject ink of respective colors. The print heads 6y, 6m are arranged to be separated in left and right. The reason for this layout is to make the order in which colors are superimposed in a forward scanning stroke of the reciprocating motion of the carriage 5 equal to that in a backward scanning stroke, thereby preventing colors formed in the forward scanning stroke from being different from colors formed in the backward scanning stroke. Note that the layout of the print heads 6 illustrated in FIG. 3 is only an example and is not limited to this example.

The above-described elements of the image forming apparatus 100 according to the embodiment are arranged inside an exterior housing 1. The exterior housing 1 includes a cover member 2 operable to open and close. At maintenance of the image forming apparatus 100 or at occurrence of paper jam, the work on the elements arranged inside the exterior housing 1 can be performed by opening the cover member 2.

The image forming apparatus 100 according to the embodiment intermittently conveys the recording medium M in the sub-scanning direction (the direction indicated by the arrows B in FIGS. 1 to 3). During when the conveyance of the recording medium M in the sub-scanning direction is suspended, the image forming apparatus 100 ejects ink onto the recording medium M on the platen 16 from the nozzle arrays of the print heads 6 mounted on the carriage 5 while causing the carriage 5 to travel in the main-scanning direction, thereby forming an image on the recording medium M.

Color calibration for calibrating colors of the image forming apparatus 100 is performed by forming a large number of color measurement patterns CP by ejecting ink onto the recording medium M on the platen 16 from the print heads 6 and carrying out color measurement of the color measurement patterns CP. The color measurement patterns CP are actually formed on the recording medium M by the image forming apparatus 100 using ink and therefore reflect characteristics specific to the image forming apparatus 100. Therefore, a device profile that describes the characteristics specific to the image forming apparatus 100 can be created or corrected using color measurement values of the color measurement patterns CP. The device profile allows the image forming apparatus 100 to form an image with high reproducibility by performing color conversion between a standard color space and device-dependent colors based on the device profile.

The image forming apparatus 100 according to the embodiment includes a color measurement camera 20 (image capturing device, color measurement apparatus) having a function of capturing an image of the color measurement patterns CP formed on the recording medium M and calculating color measurement values of the color measurement patterns CP. As illustrated in FIG. 2, the color measurement camera 20 is supported on the carriage 5 where the print heads 6 are mounted. The color measurement camera 20 is moved over the recording medium M where the color measurement patterns CP are formed by conveyance of the recording medium M and traveling of the carriage 5. When brought to a position where the color measurement camera 20 faces the color measurement patterns CP, the color measurement camera 20 captures an image. The color measurement camera 20 calculates color measurement values of the color measurement patterns CP based on RGB values of the color measurement patterns CP obtained by capturing the image.

Specific Example of Color Measurement Camera

Figure 4A:
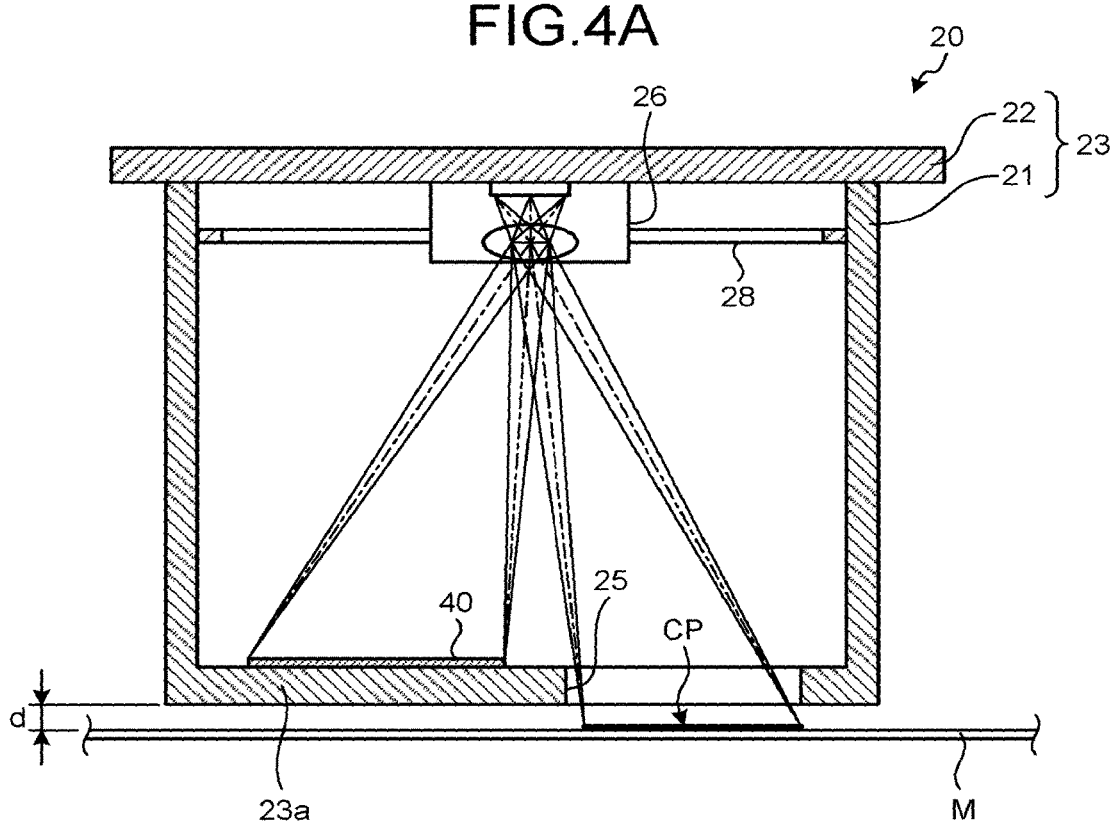
FIG. 4A is a vertical cross-sectional view (cross-sectional view taken along line X1-X1 in FIG. 4C) of a color measurement camera.
Figure 4B:
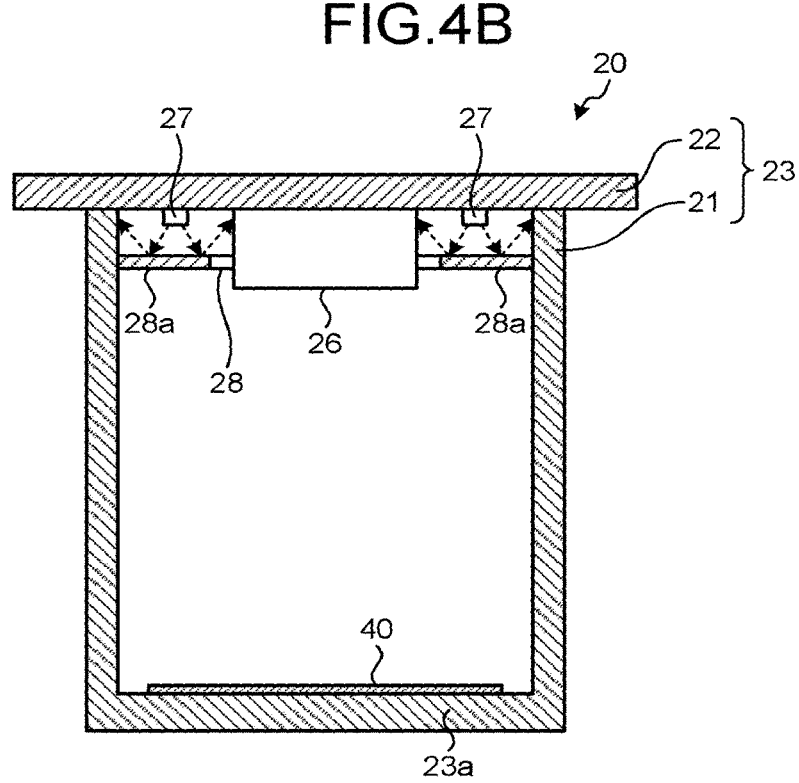
FIG. 4B is a vertical cross-sectional view (cross-sectional view taken along line X2-X2 in FIG. 4C) of the color measurement camera.
Figure 4C:
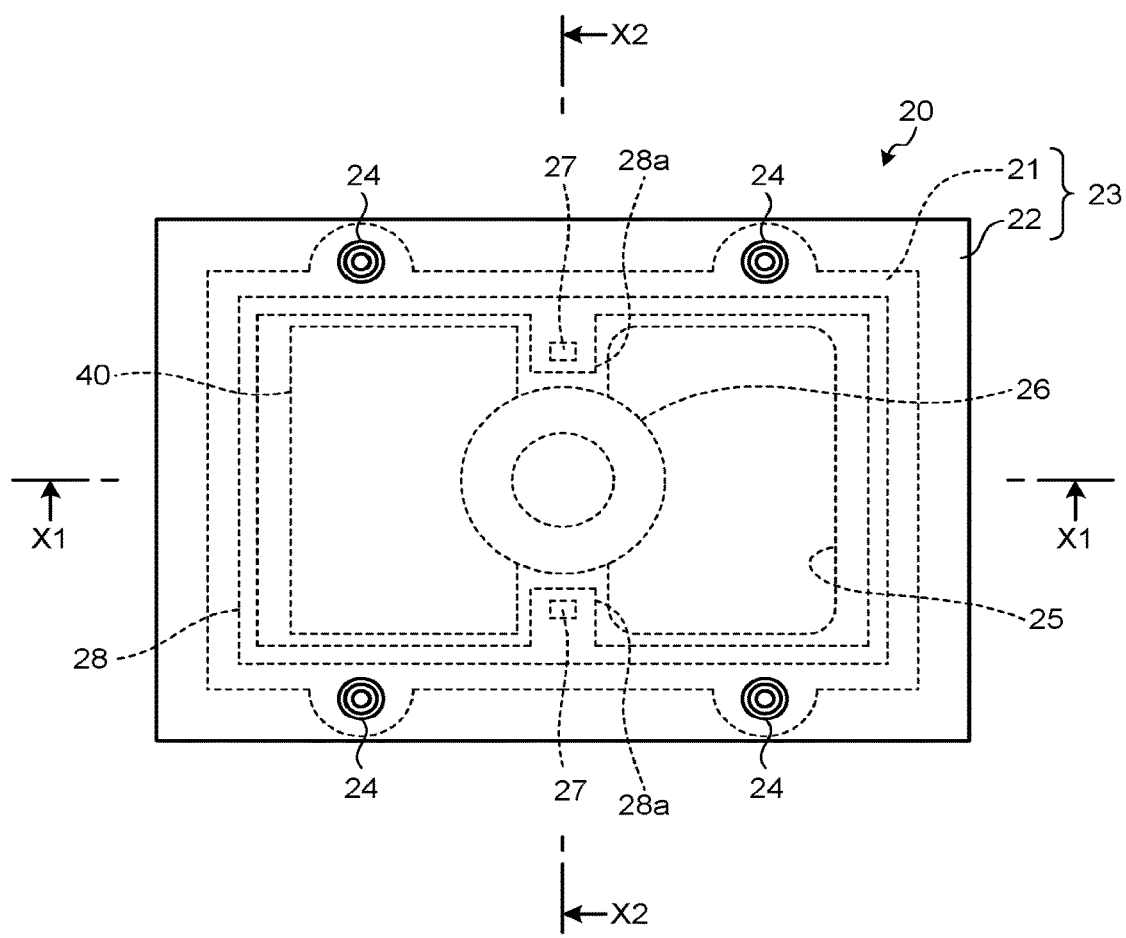
FIG. 4C is a top view transparently illustrating interior of a casing of the color measurement camera.

A specific example of the color measurement camera 20 is described in detail below with reference to FIGS. 4A to 4C. FIG. 4A to FIG. 4C are diagrams illustrating an example of a mechanical structure of the color measurement camera 20. FIG. 4A is a vertical cross-sectional view (cross-sectional view taken along line X1-X1 in FIG. 4C) of the color measurement camera 20. FIG. 4B is a vertical cross-sectional view (cross-sectional view taken along line X2-X2 in FIG. 4C) of the color measurement camera 20. FIG. 4C is a top view transparently illustrating interior of a casing 23 of the color measurement camera 20.

The color measurement camera 20 includes the casing 23 formed by combining a frame body 21 and a circuit board 22. The frame body 21 has a closed-end cylindrical shape that is open at one end of the casing 23 that it to be the top surface. The circuit board 22 is fastened to the frame body 21 into one piece therewith with fastening members 24 so as to seal the open end of the frame body 21, thereby forming a top surface of the casing 23.

The casing 23 is fixed to the carriage 5 such that a bottom portion 23a of the casing 23 faces the recording medium M on the platen 16 with a predetermined gap d therebetween. An opening 25 that allows an image of a subject, namely, the color measurement patterns CP formed on the recording medium M to be captured from inside the casing 23 is defined in the bottom portion 23a of the casing 23 facing the recording medium M.

A two-dimensional (2D) image sensor 26 for capturing an image is arranged inside the casing 23. The 2D image sensor 26 includes an image capturing device, such as a CCD (charge-coupled device) sensor or a CMOS (complementary metal oxide semiconductor) sensor, and an imaging forming lens. The 2D image sensor 26 is mounted on, for example, an inner surface (surface where components are mounted) of the circuit board 22 such that a light-receiving surface of the 2D image sensor 26 faces the bottom portion 23a of the casing 23.

A reference chart 40 is arranged on the inner surface of the bottom portion 23a of the casing 23 to be adjacent to the opening 25. The 2D image sensor 26 captures an image of the reference chart 40 together with an image of the color measurement patterns CP when carrying out color measurement of the color measurement patterns CP. Accordingly, the reference chart 40 is arranged inside the casing 23 such that both the color measurement patterns CP outside the casing 23 and the reference chart 40 are included in an image capture area of the 2D image sensor 26. The reference chart 40 will be described in detail later.

Illumination light sources 27 for substantially uniformly illuminating the image capture area of the 2D image sensor 26 with diffused light when color measurement of the color measurement patterns CP is carried out are also arranged inside the casing 23. LEDs (light-emitting diodes) may be used as the illumination light sources 27, for example. In the embodiment, two LEDs mounted on the circuit board 22 are used as the illumination light sources 27.

The two LEDs used as the illumination light sources 27 may be arranged to overlap with an area (hereinafter, "intervening area") between the opening 25 (namely, the color measurement patterns CP which are the subject of image capture through the opening 25) and the reference chart 40 in a plan view of the image capture area of the 2D image sensor 26 as viewed along the optical axis direction of the 2D image sensor 26 from the circuit board 22, and symmetrically with respect to the 2D image sensor 26 as illustrated in FIG. 4C, for example. In other words, the two LEDs used as the illumination light sources 27 are arranged such that a line connecting the two LEDs runs through the center of the imaging forming lens of the 2D image sensor 26 and, furthermore, the opening 25 and the reference chart 40 in the casing 23 are symmetric across the intervening area with respect to the line connecting the two LEDs. When the two LEDs used as the illumination light sources 27 are arranged in this manner, the color measurement patterns CP and the reference chart 40 can be illuminated under substantially same conditions.

The above-described arrangement is only an example of desirable arrangement of the illumination light sources 27 and it is not limited to this example. It is enough that the illumination light sources 27 is arranged to be able to illuminate the image capture area of the 2D image sensor 26 substantially uniformly, and the illumination light sources 27 are not necessarily directly mounted on the circuit board 22. Although the LEDs are used as the illumination light sources 27 in the embodiment, the type of the light sources is not limited to LEDs. For example, OLEDs (organic light-emitting diodes) or the like may be used as the illumination light sources 27. Using OLEDs as the illumination light sources 27 can increase accuracy in color measurement. This is because OLEDs provide illumination light that is similar in spectrum to sunlight.

Meanwhile, to illuminate the color measurement patterns CP outside the casing 23 under the same illumination condition as that of the reference chart 40 arranged inside the casing 23, it is necessary to prevent external light from impinging on the color measurement patterns CP during image capture so that the color measurement patterns CP are illuminated only with illumination light provided by the illumination light sources 27. To prevent external light from impinging on the color measurement patterns CP, it is effective to narrow the gap d between the bottom portion 23a of the casing 23 and the recording medium M, thereby blocking external light traveling toward the color measurement patterns CP with the casing 23. However, if the gap d between the bottom portion 23a of the casing 23 and the recording medium M is narrowed excessively, contact between the recording medium M and the bottom portion 23a of the casing 23 can occur, by which appropriate image capture can be inhibited. Accordingly, with consideration given to the flatness of the recording medium M, it is desirable to set the gap d between the bottom portion 23a of the casing 23 and the recording medium M to such a value that is small but does not bring the recording medium M into contact with the bottom portion 23a of the casing 23. For example, if the gap d between the bottom portion 23a of the casing 23 and the recording medium M is set to approximately 1 or 2 mm, impinging of external light on the recording medium M can be effectively prevented without causing contact between the recording medium M and the bottom portion 23a of the casing 23.

Narrowing the gap d between the bottom portion 23a of the casing 23 and the recording medium M also allows the difference between an optical path length from the 2D image sensor 26 to the color measurement patterns CP and an optical path length from the 2D image sensor 26 to the reference chart 40 to be within a range of the depth of field of the 2D image sensor 26. The color measurement camera 20 according to the embodiment is configured such that the 2D image sensor 26 captures an image of the color measurement patterns CP outside the casing 23 and an image of the reference chart 40 arranged inside the casing 23 simultaneously. Accordingly, if the difference between the optical path length from the 2D image sensor 26 to the color measurement patterns CP and the optical path length from the 2D image sensor 26 to the reference chart 40 should exceed the depth of field of the 2D image sensor 26, the 2D image sensor 26 cannot capture an image focused on both the color measurement patterns CP and the reference chart 40.

An approximate difference between the optical path length from the 2D image sensor 26 to the color measurement patterns CP and the optical path length from the 2D image sensor 26 to the reference chart 40 can be obtained by adding the gap d to the thickness of the bottom portion 23a of the casing 23. Accordingly, if the gap d is set to a sufficiently small value, because the difference between the optical path lengths falls within the range of the depth of field of the 2D image sensor 26, the 2D image sensor 26 can capture an image focused on both the color measurement patterns CP and the reference chart 40. For example, if the gap d between the bottom portion 23a of the casing 23 and the recording medium M is set to approximately 1 or 2 mm, the difference between the optical path lengths can be brought within the range of the depth of field of the 2D image sensor 26.

Meanwhile, the depth of field of the 2D image sensor 26 is a characteristic specific to the 2D image sensor 26 and depends on the f-number of the 2D image sensor 26, a focal length of the imaging forming lens, the distance between the 2D image sensor 26 and a subject, and the like. In the color measurement camera 20 according to the embodiment, the 2D image sensor 26 is designed such that, when the gap d between the bottom portion 23a of the casing 23 and the recording medium M is set to a sufficiently small value, e.g., approximately 1 or 2 mm, the difference between the optical path length from the 2D image sensor 26 to the color measurement patterns CP and the optical path length from the 2D image sensor 26 to the reference chart 40 falls within the range of the depth of field.

In the color measurement camera 20 according to the embodiment, the 2D image sensor 26 captures an image of the image capture area including the color measurement patterns CP, which are the subject, and the reference chart 40 under illumination provided by the illumination light sources 27. However, if light emitted from the illumination light sources 27 and specularly reflected from the image capture area of the 2D image sensor 26 impinges on the 2D image sensor 26, the image captured by the 2D image sensor 26 undesirably includes a defective image created by the specularly reflected light, which exerts a negative effect on color measurement of the color measurement patterns CP. Accordingly, the color measurement camera 20 according to the embodiment includes, inside the casing 23, a light blocking member 28 for preventing light specularly reflected off the image capture area of the 2D image sensor 26 from impinging on the 2D image sensor 26.

The light blocking member 28 is arranged so as to block light traveling from the illumination light sources 27 toward a specular reflection position. The specular reflection position is a position that is in the image capture area and where, if light travels from the illumination light sources 27, the light would be specularly reflected to the 2D image sensor 26. In particular, in the color measurement camera 20 according to the embodiment, the light blocking member 28 is arranged inside the casing 23 at a position outside the image capture area of the 2D image sensor 26.

Figure 5:
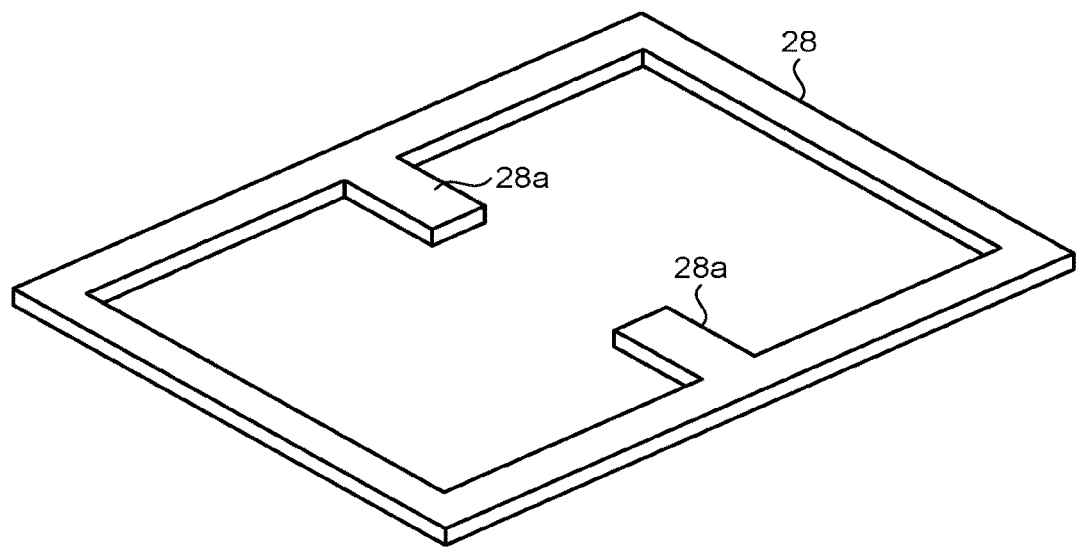
FIG. 5 is a perspective view illustrating an example of a light blocking member.

FIG. 5 is a perspective view illustrating an example of the light blocking member 28. The light blocking member 28 has a shape where a pair of light blocking pieces 28a, each corresponding to one of the two LEDs used as the illumination light sources 27, is joined via the same rectangular frame that conforms to the plane shape of an inner wall of the casing 23. The light blocking member 28 may be manufactured by punching a metal plate, for example. The light blocking member 28 is fixed to the casing 23 by, for example, fitting a rim of the frame into a slit defined in the inner wall of the casing 23. Configuring the light blocking member 28 as described above improves the assembly inside the casing 23 and increases rigidity of the pair of light blocking pieces 28a. Furthermore, because the light blocking member 28 can be manufactured by punching, the light blocking member 28 can be manufactured easily.

Note that the shape of the light blocking member 28 illustrated in FIG. 5 is only an example and is not limited to this example. For example, only the pair of light blocking pieces 28a, each corresponding to one of the two LEDs used as the illumination light sources 27, may be used as the light blocking member 28; put another way, the light blocking member 28 may be configured without the rectangular frame that joins the pair of light blocking pieces 28a together. To implement this configuration, the pair of light blocking pieces 28a used as the light blocking member 28 may preferably be fixed to the casing 23 by being attached to the inner wall of the casing 23 with an adhesive, for example. Alternatively, the pair of light blocking pieces 28a may be formed integrally with the inner wall of the casing 23.

As described above, the light blocking member 28 is arranged at the position which is outside the image capture area of the 2D image sensor 26 and at which the light blocking pieces 28a can block light traveling from the illumination light sources 27 toward the specular reflection position. The position where the light blocking member 28 is arranged is described in more detail below with reference to FIG. 6.

Figure 6:
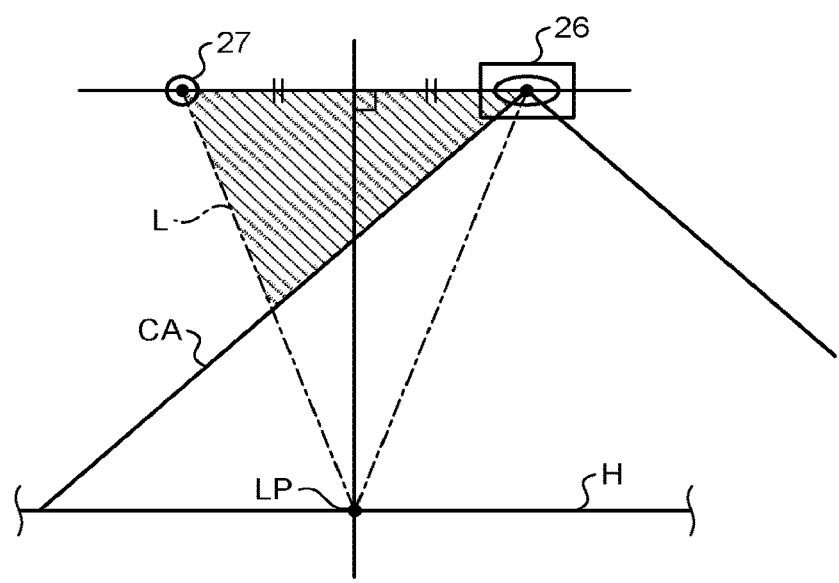
FIG. 6 is a diagram illustrating relationship among a specular reflection position, the angle of view of a 2D image sensor, and a position where the light blocking member is arranged.

FIG. 6 is a diagram illustrating relationship among the specular reflection position, the angle of view of the 2D image sensor 26, and the position where the light blocking member 28 is arranged. In FIG. 6, the angle of view of the 2D image sensor 26 is indicated by CA; the plane of projection of the image capture area of the 2D image sensor 26 is indicated by H; the specular reflection position in the image capture area of the 2D image sensor 26 is indicated by LP. In FIG. 6, the optical path of light traveling from the illumination light sources 27 toward the specular reflection position LP is indicated by L. Note that although only a portion (which is the portion to the left of the 2D image sensor 26 in FIG. 6) corresponding to one of the two illumination light sources (e.g., LEDs) is illustrated in FIG. 6, similar relationship holds true for the portion corresponding to the other of the two illumination light sources 27.

For brevity of description, it is assumed that the vertical position of the imaging forming lens of the 2D image sensor 26 and the vertical position of the illumination light sources 27 are the same, and a line connecting the imaging forming lens of the 2D image sensor 26 and the illumination light sources 27 is parallel to the projection plane H of the image capture area of the 2D image sensor 26. The angle of view CA of the 2D image sensor 26 is a fixed value that depends on performance of the 2D image sensor 26 (more specifically, performance of the imaging forming lens).

When the vertical position of the imaging forming lens of the 2D image sensor 26 and the vertical position of the illumination light sources 27 are the same, the specular reflection position LP in the image capture area of the 2D image sensor 26 is on the intersection point between the perpendicular bisector of the line connecting the imaging forming lens of the 2D image sensor 26 and the illumination light sources 27 and the projection plane H of the image capture area of the 2D image sensor 26. The area outside the angle of view CA (i.e., to the left of CA in FIG. 6) of the 2D image sensor 26 is the area outside the image capture area of the 2D image sensor 26. Accordingly, the entire light blocking member 28 may be arranged outside the angle of view CA of the 2D image sensor 26 with the light blocking piece 28a protruding into the hatched area in FIG. 6 from the left in FIG. 6.

If arranged as described above, the light blocking member 28 can effectively prevent light specularly reflected off the image capture area of the 2D image sensor 26 from impinging on the 2D image sensor 26. Furthermore, because the light blocking member 28 is arranged outside the image capture area of the 2D image sensor 26, an undesirable situation that bright reflection light reflected from the light blocking member 28 impinges on the 2D image sensor 26 will not occur. Accordingly, an image obtained by the 2D image sensor 26 by capturing the image capture area including the color measurement patterns CP and the reference chart 40 under illumination provided by the illumination light sources 27 will not contain a defective image created by specularly reflected light or bright reflection light reflected from the light blocking member 28. Therefore, color measurement values of the color measurement patterns CP can be calculated accurately using this image.

As described above, the light blocking member 28 is arranged outside the image capture area of the 2D image sensor 26. However, light reflected from the surface of the light blocking member 28 can become stray light and impinge on the 2D image sensor 26. To prevent production of stray light, it is desirable to perform surface finishing on the light blocking member 28 for absorbing or attenuating light traveling from the illumination light sources 27. Examples of effective surface finishing include applying paint having a high light absorptance, such as black paint, to the surface of the light blocking member 28. Alternatively, the surface of the light blocking member 28 may be configured to have an anti-reflective structure. Further alternatively, an anti-reflection film may be attached onto the surface of the light blocking member 28. Examples of the anti-reflection film include a moth-eye (registered trade mark) film that reduces reflections with minute bumps. By performing such surface finishing as that described before on the light blocking member 28, reflections of light traveling from the illumination light sources 27 and incident on the light blocking member 28 off the surface of the light blocking member 28 can be reduced. As a result, impinging of stray light on the 2D image sensor 26 can be effectively prevented.

As described above, the light blocking member 28 is configured to block light traveling from the illumination light sources 27 toward the specular reflection position in the image capture area with the light blocking pieces 28a. However, if the light blocking pieces 28a are excessively large, the amount of diffused light with which the color measurement patterns CP and the reference chart 40 in the image capture area are to be irradiated can decrease. Taking this into consideration, the light blocking pieces 28a of the light blocking member 28 are desirably configured to block light traveling from the illumination light sources 27 toward the specular reflection position in the image capture area while causing the color measurement patterns CP and the reference chart 40 in the image capture area to be irradiated with a sufficient amount of diffused light.

As described above, in the embodiment, the two LEDs used as the illumination light sources 27 are arranged so as to overlap with the intervening area between the opening 25 and the reference chart 40 in the plan view of the image capture area of the 2D image sensor 26 as viewed along the optical axis direction of the 2D image sensor 26 from the circuit board 22 (see FIG. 4C). With this configuration, the pair of light blocking pieces 28a of the light blocking member 28 is desirably arranged at positions overlapping with the illumination light sources 27 in the intervening area but not overlapping with the opening 25 nor with the reference chart 40 in the plan view of the image capture area of the 2D image sensor 26 as viewed along the optical axis direction of the 2D image sensor 26 from the circuit board 22 as illustrated in FIG. 4C. Furthermore, the light blocking pieces 28a are desirably arranged at a position closer to the intervening area in the optical axis direction of the 2D image sensor 26 than positions of the illumination light sources 27 are. When arranged in this manner, the light blocking pieces 28a of the light blocking member 28 can block light traveling from the illumination light sources 27 toward the specular reflection position in the image capture area while causing the color measurement patterns CP and the reference chart 40 in the image capture area to be irradiated with a sufficient amount of diffused light.

Specific Example of Reference Chart

Figure 7:
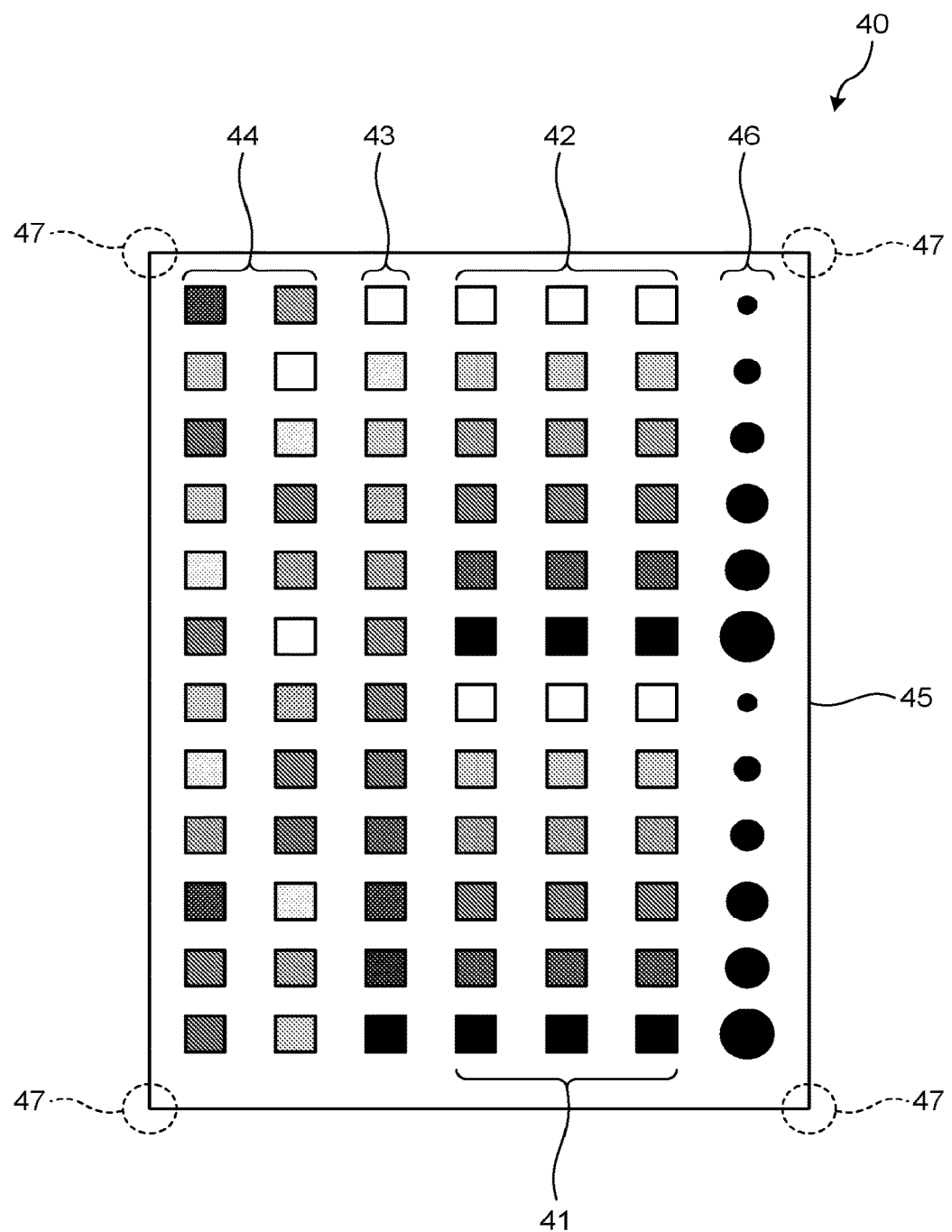
FIG. 7 is a diagram illustrating a specific example of a reference chart.

The reference chart 40 arranged inside the casing 23 of the color measurement camera 20 is specifically described below with reference to FIG. 7. FIG. 7 is a diagram illustrating a specific example of the reference chart 40.

The reference chart 40 illustrated in FIG. 7 contains a plurality of reference patch rows 41 to 44 where reference patches for use in color measurement are arrayed, a dot-diameter-measurement pattern row 46, a distance measurement line 45, and chart locating markers 47.

The reference patch rows 41 to 44 contain the reference patch rows 41 where reference patches of primary colors YMCK (yellow, magenta, cyan, and black) are arrayed in the order of tonal value, the reference patch rows 42 where reference patches of secondary colors RGB (red, green, and blue) are arrayed in the order of tonal value, the reference patch row 43 where reference patches of gray scales are arrayed in the order of tonal value, and the reference patch rows 44 where reference patches of tertiary colors are arrayed. The dot-diameter-measurement pattern row 46 is a row of patterns where circular patterns of different sizes are arrayed in the order of size. The dot-diameter-measurement pattern row 46 can be used in measuring the dot diameter of an image formed on the recording medium M.

The distance measurement line 45 is formed as a rectangular frame surrounding the reference patch rows 41 to 44 and the dot-diameter measurement pattern row 46. The chart locating markers 47 are arranged at four corners of the distance measurement line 45 and function as markers for locating each of the reference patches. The position of the reference chart 40 and the positions of the respective reference patches and the patterns can be located by specifying the distance measurement line 45 and the chart locating markers 47 at the four corners of the distance measurement line 45 in an image of the reference chart 40 captured by the 2D image sensor 26.

Each of the reference patches belonging to the reference patch rows 41 to 44 for use in color measurement is used as a reference of a color hue reflecting an image-capture condition of the color measurement camera 20. Meanwhile, configuration of the reference patch rows 41 to 44 in the reference chart 40 for use in color measurement is not limited to the example illustrated in FIG. 7, and any reference patch rows may be used. For example, reference patches that allow colors over a color range as wide as possible to be specified may be used. The reference patch rows 41 of the primary colors YMCK and the reference patch row 43 of the gray scales may alternatively be formed with patches of color measurement values of ink used by the image forming apparatus 100. The reference patch rows 42 of the secondary colors RGB may alternatively be formed with patches of color measurement values of colors that can be formed with ink used by the image forming apparatus 100. A standard color patch in accordance with, for example, a Japan Color standard, where color measurement values are defined may be used.

In the embodiment, the reference chart 40 containing the reference patch rows 41 to 44 of a typical patch (color patch) style is used. However, the style of the reference chart 40 is not limited to such a style containing the reference patch rows 41 to 44. The reference chart 40 may have any configuration so long as a plurality of colors usable in color measurement is arranged in a manner that allows the position of each color to be identified.

Because the reference chart 40 is arranged adjacent to the opening 25 on the bottom portion 23a of the casing 23 of the color measurement camera 20, the 2D image sensor 26 can capture an image of the reference chart 40 and an image of the color measurement patterns CP, which are the target of color measurement, simultaneously. "Capturing an image of the reference chart 40 and an image of the color measurement patterns CP simultaneously" means obtaining image data representing one frame containing the color measurement patterns CP, which are the target of color measurement, and the reference chart 40. More specifically, even if pixels constituting image data representing one frame are obtained over a certain time range, so long as the image data representing the one frame containing the color measurement patterns CP and the reference chart 40 is obtained, it is regarded that an image of the color measurement patterns CP and an image of the reference chart 40 are captured simultaneously.

Note that the mechanical structure of the color measurement camera 20 described above is only an example and is not limited to this example. The color measurement camera 20 according to the embodiment may have any configuration so long as the light blocking member 28 is arranged outside the image capture area of the 2D image sensor 26 and configured to prevent light specularly reflected from the image capture area from impinging on the 2D image sensor. Accordingly, the color measurement camera 20 may be modified or altered from the configuration described above in various manners. Modifications of the color measurement camera 20 will be described later.

Schematic Configuration of Control Mechanism of Image Forming Apparatus

Figure 8:
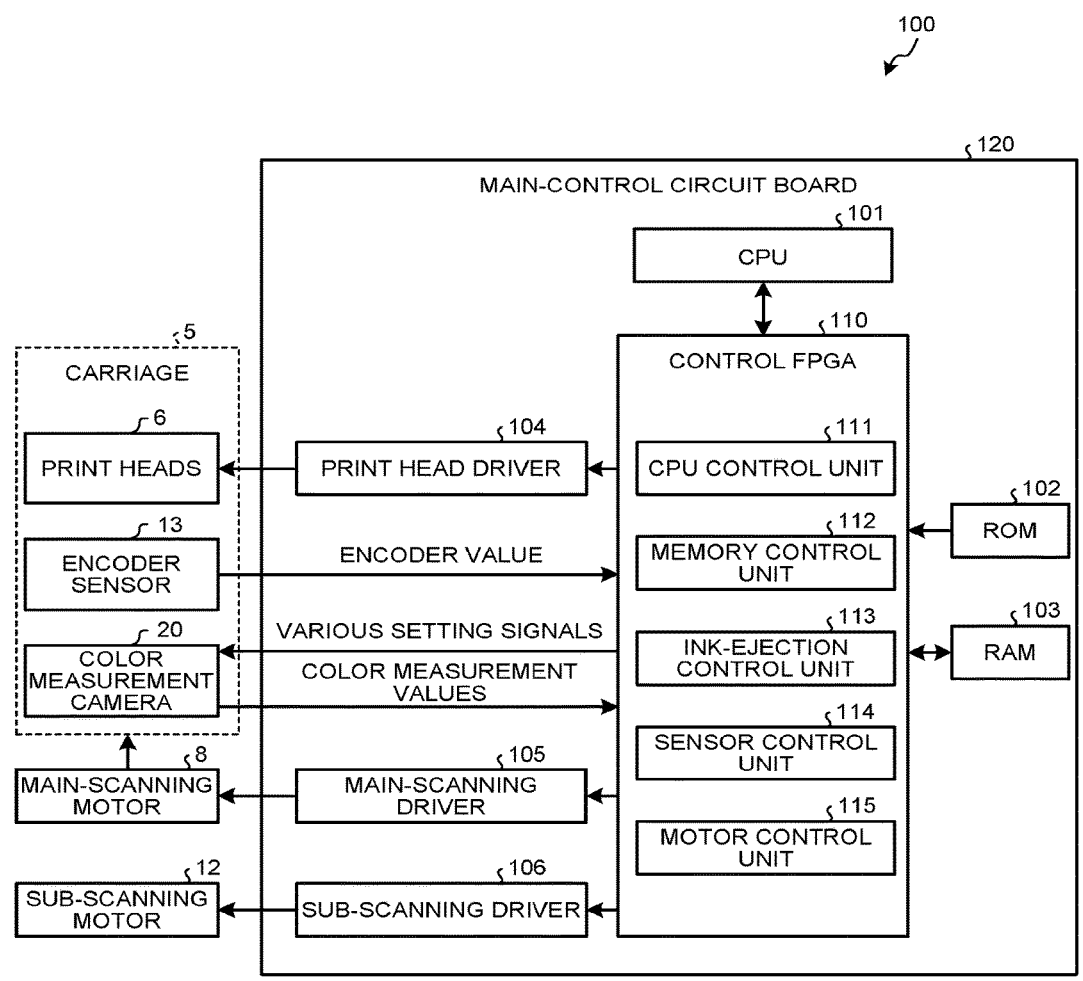
FIG. 8 is a block diagram of a control mechanism of the image forming apparatus.

A schematic configuration of a control mechanism of the image forming apparatus 100 according to the embodiment is described below with reference to FIG. 8. FIG. 8 is a block diagram illustrating the schematic configuration of the control mechanism of the image forming apparatus 100.

As illustrated in FIG. 8, the image forming apparatus 100 according to the embodiment includes a CPU (central processing unit) 101, a ROM (read-only memory) 102, a RAM (random access memory) 103, a print head driver 104, a main-scanning driver 105, a sub-scanning driver 106, a control FPGA (field-programmable gate array) 110, the print heads 6, the color measurement camera 20, the encoder sensor 13, the main-scanning motor 8, and the sub-scanning motor 12. The CPU 101, the ROM 102, the RAM 103, the print head driver 104, the main-scanning driver 105, the sub-scanning driver 106, and the control FPGA 110 are mounted on a main-control circuit board 120. The print heads 6, the encoder sensor 13, and the color measurement camera 20 are mounted on the carriage 5 as described earlier.

The CPU 101 provides overall control of the image forming apparatus 100. For example, the CPU 101 executes various control programs stored in the ROM 102 by utilizing the RAM 103 as a working area and outputs control commands for controlling various operations of the image forming apparatus 100.

The print head driver 104, the main-scanning driver 105, and the sub-scanning driver 106 are drivers for driving the print heads 6, the main-scanning motor 8, and the sub-scanning motor 12, respectively.

The control FPGA 110 controls, in cooperation with the CPU 101, various operations of the image forming apparatus 100. The control FPGA 110 includes, as functional components, a CPU control unit 111, a memory control unit 112, an ink-ejection control unit 113, a sensor control unit 114, and a motor control unit 115.

The CPU control unit 111 provides a variety of information acquired by the control FPGA 110 to the CPU 101 and receives control commands output from the CPU 101 by carrying out communications with the CPU 101.

The memory control unit 112 provides memory control to allow the CPU 101 to access the ROM 102 and the RAM 103.

The ink-ejection control unit 113 controls operation of the print head driver 104 in accordance with a control command fed from the CPU 101, thereby controlling timing for ink ejection from the print heads 6 that are driven by the print head driver 104.

The sensor control unit 114 processes sensor signals such as an encoder value output from the encoder sensor 13.

The motor control unit 115 controls operation of the main-scanning driver 105 in accordance with a control command fed from the CPU 101 to control the main-scanning motor 8 that is driven by the main-scanning driver 105, thereby controlling traveling of the carriage 5 in the main-scanning direction. The motor control unit 115 also controls operation of the sub-scanning driver 106 in accordance with a control command fed from the CPU 101 to control the sub-scanning motor 12 that is driven by the sub-scanning driver 106, thereby controlling conveyance of the recording medium M in the sub-scanning direction on the platen 16.

The units described above are only an example of control functions implemented by the control FPGA 110. The control FPGA 110 may be configured to implement various control functions other than those described above. All or a part of the control functions described above may be implemented by a program(s) executed by the CPU 101 or another general-purpose CPU. A part of the control functions described above may be implemented by other dedicated hardware such as an FPGA other than the control FPGA 110 or an ASIC (application specific integrated circuit).

The print heads 6 are driven by the print head driver 104, operation of which is controlled by the CPU 101 and the control FPGA 110, to form an image by ejecting ink onto the recording medium M on the platen 16.

The encoder sensor 13 obtains an encoder value by detecting the marker on the encoder sheet 14 and outputs the encoder value to the control FPGA 110. The encoder value is sent from the control FPGA 110 to the CPU 101 and used in calculating the position and the velocity of the carriage 5, for example. The CPU 101 generates the control command for controlling the main-scanning motor 8 based on the position and the velocity of the carriage 5 calculated from the encoder value and outputs the control command.

As described earlier, the color measurement camera 20 performs color calibration of the image forming apparatus 100 as follows. The color measurement camera 20 captures an image of the color measurement patterns CP formed on the recording medium M, together with the reference chart 40. The color measurement camera 20 calculates color measurement values (colorimetric values in a standard color space which may be L*a*b* values in the L*a*b* color space, for example) of the color measurement patterns CP based on RGB values of the color measurement patterns CP and RGB values of the respective reference patches of the reference chart 40 obtained from the captured image. The color measurement values of the color measurement patterns CP calculated by the color measurement camera 20 are sent to the CPU 101 via the control FPGA 110. An example of a specific method for calculating the color measurement values of the color measurement patterns CP is disclosed in Japanese Laid-open Patent Application No. 2013-051671.

Configuration of Control Mechanism of Color Measurement Camera

Figure 9:
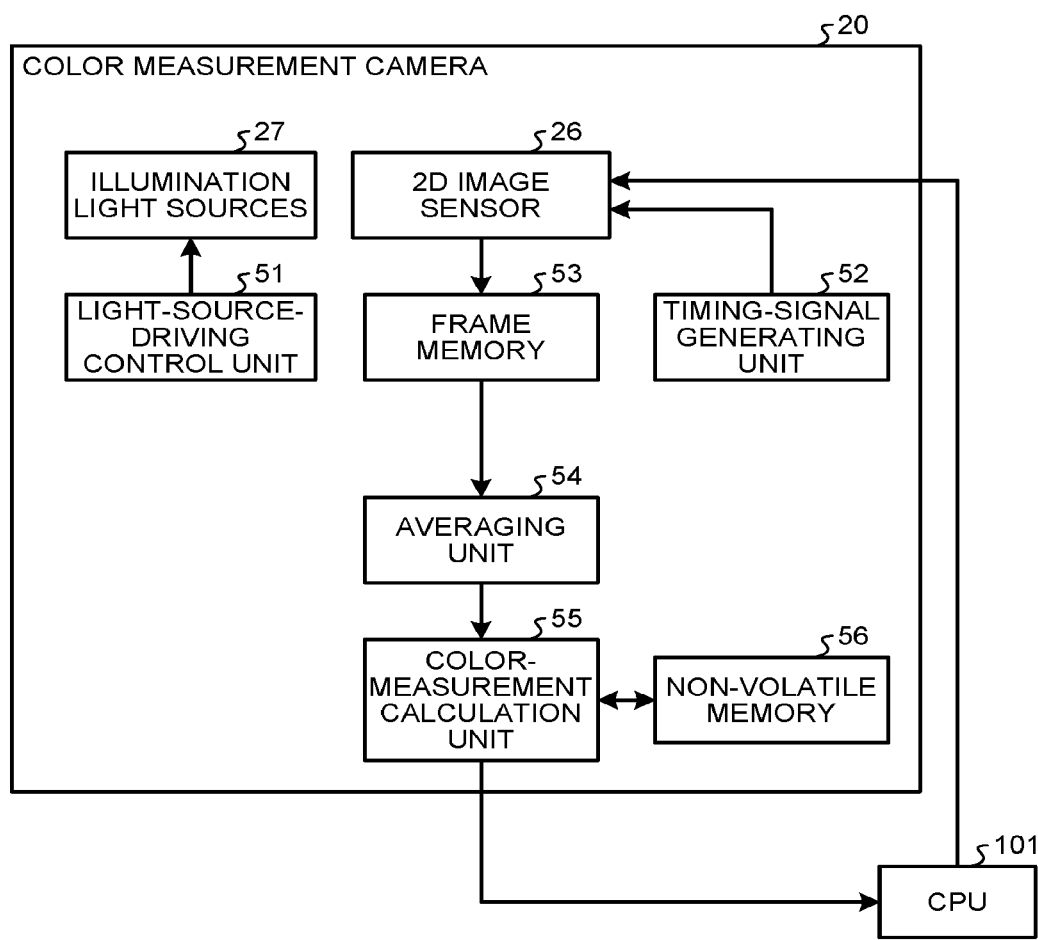
FIG. 9 is a block diagram of a control mechanism of the color measurement camera.

A control mechanism of the color measurement camera 20 is specifically described below with reference to FIG. 9. FIG. 9 is a block diagram illustrating an example configuration of the control mechanism of the color measurement camera 20.

As illustrated in FIG. 9, the color measurement camera 20 includes, in addition to the 2D image sensor 26 and the illumination light sources 27 described above, a light-source-driving control unit 51, a timing-signal generating unit 52, a frame memory 53, an averaging unit 54, a color-measurement calculation unit 55, and a non-volatile memory 56. These units may be mounted on, for example, the circuit board 22 that forms the top surface of the casing 23 of the color measurement camera 20.

The 2D image sensor 26 converts light incident on the 2D image sensor 26 into electrical signals and outputs image data of the image capture area illuminated by the illumination light sources 27. The 2D image sensor 26 incorporates functions of performing analog-to-digital conversion of converting analog signals, which are obtained by the photoelectric conversion, into digital image data, performing various image processing such as shading correction, white balancing, gamma correction, and image-data format conversion on the digital image data, and outputting the thus-processed image data. Various operation settings of the 2D image sensor 26 are configured in accordance with various setting signals fed from the CPU 101. The various image processing operations to be performed on image data may be partly or entirely performed in the exterior of the 2D image sensor 26.

At image capture by the 2D image sensor 26, the light-source-driving control unit 51 generates a light-source driving signal for turning on the illumination light sources 27 and supplies the light-source driving signal to the illumination light sources 27.

The timing-signal generating unit 52 generates a timing signal for controlling timing of when the 2D image sensor 26 should start image capture and supplies the timing signal to the 2D image sensor 26.

The frame memory 53 temporarily stores an image output from the 2D image sensor 26.

The averaging unit 54 extracts, for color measurement of the color measurement patterns CP, a region where the color measurement patterns CP is reflected and regions where respective reference patches of the reference chart 40 are reflected from the image output from the 2D image sensor 26 and temporarily stored in the frame memory 53. The averaging unit 54 averages image data representing the region of the color measurement patterns CP and outputs values obtained by this averaging to the color-measurement calculation unit 55 as RGB values of the color measurement patterns CP. The averaging unit 54 also averages image data representing each of the regions of the reference patches and outputs values obtained by this averaging to the color-measurement calculation unit 55 as RGB values of the respective reference patches.

The color-measurement calculation unit 55 calculates color measurement values of the color measurement patterns CP based on the RGB values of the color measurement patterns CP and the RGB values of the respective reference patches of the reference chart 40 obtained by averaging performed by the averaging unit 54. The color measurement values of the color measurement patterns CP calculated by the color-measurement calculation unit 55 are sent to the CPU 101 on the main-control circuit board 120. It is noted that the color-measurement calculation unit 55 can calculate the color measurement values of the color measurement patterns CP using, for example, the method disclosed in Japanese Laid-open Patent Application No. 2013-051671, and therefore detailed description of processing performed by the color-measurement calculation unit 55 is omitted.

The non-volatile memory 56 stores various data including data involved in calculation of the color measurement values of the color measurement patterns CP performed by the color-measurement calculation unit 55.

As described in detail above through specific examples, the color measurement camera 20 according to the embodiment includes the light blocking member 28 arranged outside the image capture area of the 2D image sensor 26 to block light traveling from the illumination light sources 27 to the specular reflection position LP in the image capture area of the 2D image sensor 26. Accordingly, when an image of the image capture area including the color measurement patterns CP and the reference chart 40 is captured by the 2D image sensor 26 under illumination provided by the illumination light sources 27, the image of the image capture area does not contain a defective image created by specularly reflected light or bright reflection light reflected from the light blocking member 28. Therefore, the color measurement camera 20 according to the embodiment can calculate color measurement values of the color measurement patterns CP with high accuracy using this image.

The image forming apparatus 100 according to the embodiment can perform color calibration appropriately, and therefore can form an image with high reproducibility. This is because color measurement of the color measurement patterns CP formed on the recording medium M can be carried out with high accuracy by using the color measurement camera 20.

Modifications of Color Measurement Camera

Modifications (first to fourth modifications) of the color measurement camera 20 according to the embodiment are described below. Hereinafter, the first modification of the color measurement camera 20 is referred to as a color measurement camera 20A; the second modification of the color measurement camera 20 is referred to as a color measurement camera 20B; the third modification of the color measurement camera 20 is referred to as a color measurement camera 20C; the fourth modification of the color measurement camera 20 is referred to as a color measurement camera 20D. In each of the modifications, elements identical to those of the color measurement camera 20 described above are identified by like reference numerals, and repeated description is omitted.

First Modification

Figure 10:
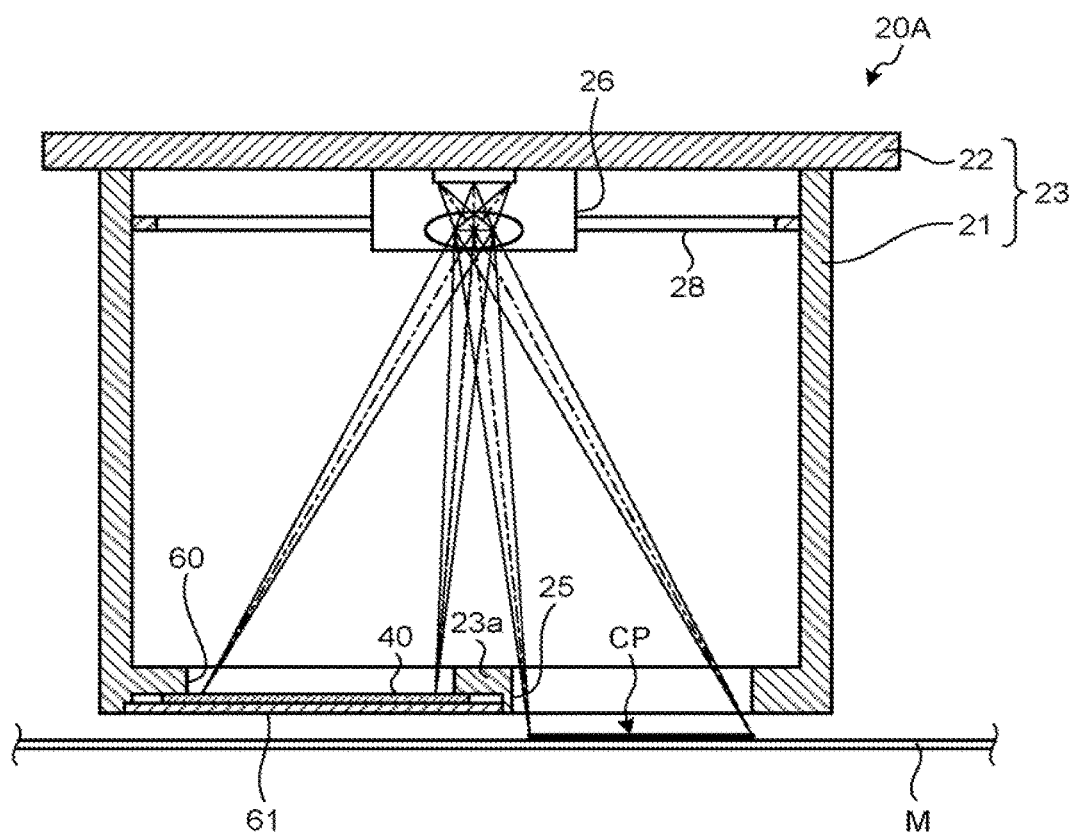
FIG. 10 is a vertical cross-sectional view of a first modification of the color measurement camera.

FIG. 10 is a vertical cross-sectional view of the color measurement camera 20A of the first modification taken along the same line as FIG. 4A which is the vertical cross-sectional view of the color measurement camera 20.

The color measurement camera 20A of the first modification has, in the bottom portion 23a of the casing 23, an opening 60 aside from the opening 25 through which an image of the color measurement patterns CP is to be captured. The reference chart 40 is detachably arranged to seal the opening 60 from outside the casing 23.

More specifically, a recess, which is in communication with the opening 60, of a size suitable for accommodating the reference chart 40 is formed in the outer surface of the bottom portion 23a of the casing 23. The reference chart 40 is arranged in the recess. In addition, a holding member 61 configured to retain the reference chart 40 by pressing the reference chart 40 in the direction from the outer surface of the bottom portion 23a of the casing 23 is removably attached to the bottom portion 23a of the casing 23. Hence, the color measurement camera 20A of the first modification allows the reference chart 40 to be taken out by removing the holding member 61 from the bottom portion 23a of the casing 23.

As in the color measurement camera 20 according to the embodiment described above, the light blocking member 28 is arranged outside the image capture area of the 2D image sensor 26 and configured to block light traveling from the illumination light sources 27 toward the specular reflection position in the image capture area of the 2D image sensor 26.

In the color measurement camera 20A of the first modification configured as described above, because the reference chart 40 is arranged closer to the outer surface of the bottom portion 23a of the casing 23, the difference between the optical path length from the 2D image sensor 26 to the color measurement patterns CP and the optical path length from the 2D image sensor 26 to the reference chart 40 is smaller than that of the color measurement camera 20 described above. Accordingly, even if the 2D image sensor 26 has a relatively small depth of field, the color measurement camera 20A can capture an image focused on both the color measurement patterns CP and the reference chart 40.

Furthermore, the color measurement camera 20A of the first modification is configured such that the reference chart 40 is removably held on the casing 23 and therefore the reference chart 40 can be taken out. Accordingly, the reference chart 40 can be replaced easily in a case where the reference chart 40 should be degraded due to adhesion of dirt or the like.

Second Modification

Figure 11:
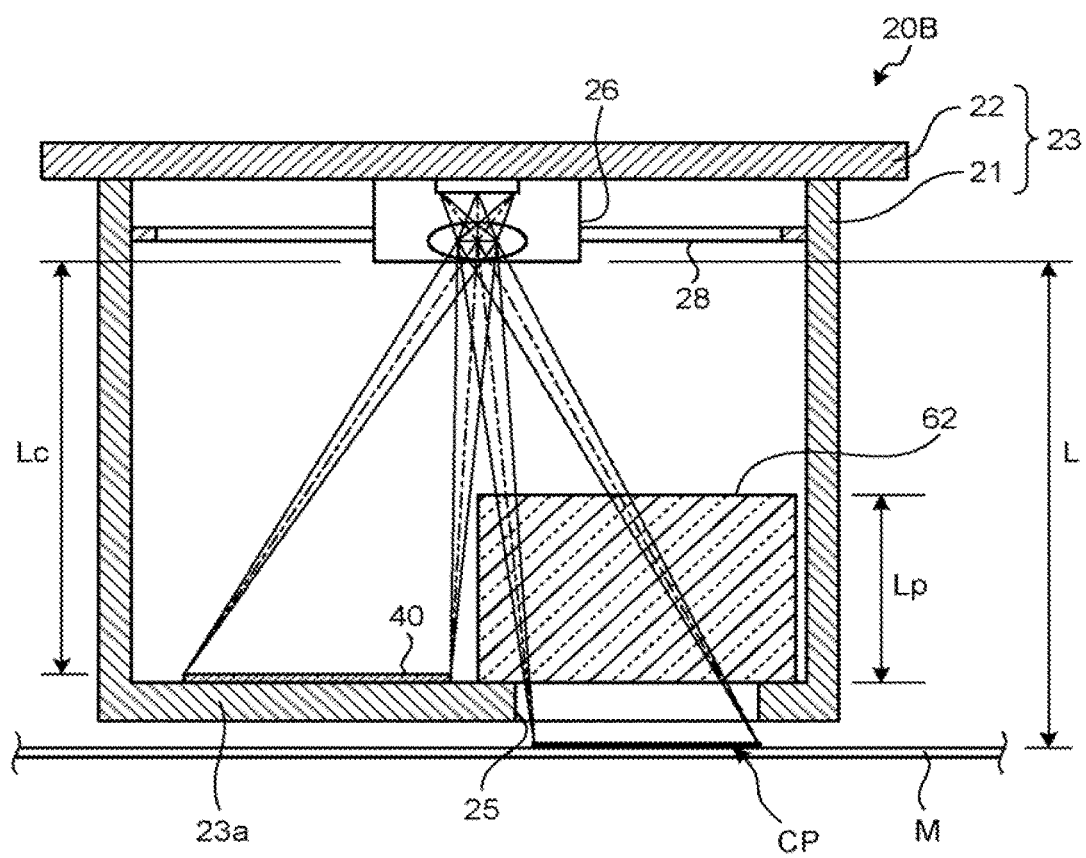
FIG. 11 is a vertical cross-sectional view of a second modification of the color measurement camera.

FIG. 11 is a vertical cross-sectional view of the color measurement camera 20B of the second modification taken along the same line as FIG. 4A which is the vertical cross-sectional view of the color measurement camera 20.

The color measurement camera 20B of the second modification includes an optical-path-length changing member 62 inside the casing 23. The optical-path-length changing member 62 is an optical element that transmits light and has a refractive index n (n can be any number). The optical-path-length changing member 62 is arranged in the optical path between the subject (the color measurement patterns CP) outside the casing 23 and the 2D image sensor 26 and has a function of bringing the focal plane of an optical image of the color measurement patterns CP closer to the focal plane of an optical image of the reference chart 40. Hence, in the color measurement camera 20B of the second modification, the optical-path-length changing member 62 is arranged in the optical path between the color measurement patterns CP and the 2D image sensor 26, thereby aligning both the focal plane of the optical image of the color measurement patterns CP outside the casing 23 and the focal plane of the reference chart 40 inside the casing 23 with the sensor surface of the 2D image sensor 26. Although an example where the optical-path-length changing member 62 is placed on the bottom portion 23a of the casing 23 is illustrated in FIG. 11, the optical-path-length changing member 62 is not necessarily placed on the bottom portion 23a. The optical-path-length changing member 62 may be arranged at any position in the optical path between the color measurement patterns CP outside the casing 23 and the 2D image sensor 26.

The optical path length of the light passing through the optical-path-length changing member 62 is lengthened by the length that depends on the refractive index n of the optical-path-length changing member 62, causing an image to appear to be floating. Height C at which the image appears to float can be calculated from the following Equation:

$$C = Lp(1-1/n)$$

where Lp is the length of the optical-path-length changing member 62 in the optical axis direction.

Distance L between the principal point of the imaging forming lens of the 2D image sensor 26 and the front focal plane (image capturing plane) of the optical image passing through the optical-path-length changing member 62 can be calculated from the following Equation:

$$L = Lc + Lp(1-1/n)$$

where Lc is the distance between the principal point of the imaging forming lens and the reference chart 40.

If the refractive index n of the optical-path-length changing member 62 is 1.5, the distance L is obtained as: L=Lc+Lp(⅓). Under this condition, the optical path length of the optical image passing through the optical-path-length changing member 62 can be lengthened by approximately one third of the length Lp of the optical-path-length changing member 62 in the optical axis direction. If, in this condition, Lp is 9 (mm), for example, the distance L is obtained as: L=Lc+3 (mm). Accordingly, if image capture is performed in a condition where the difference between the distance from the 2D image sensor 26 to the reference chart 40 and the distance from the 2D image sensor 26 to the color measurement patterns CP is 3 mm, both the rear focal plane (image forming plane) of the optical image of the reference chart 40 and the rear focal plane (image forming plane) of the optical image of the color measurement patterns CP can be aligned with the sensor surface of the 2D image sensor 26.

As in the color measurement camera 20 according to the embodiment described above, the light blocking member 28 is arranged outside the image capture area of the 2D image sensor 26 and configured to block light traveling from the illumination light sources 27 toward the specular reflection position in the image capture area of the 2D image sensor 26.

In the color measurement camera 20B of the second modification configured as described above, the optical-path-length changing member 62 is arranged in the optical path between the color measurement patterns CP and the 2D image sensor 26, thereby bringing the focal plane of the optical image of the color measurement patterns CP close to the focal plane of the optical image of the reference chart 40. Accordingly, even if the 2D image sensor 26 has a relatively small depth of field, the color measurement camera 20B can capture an appropriate image focused on both the color measurement patterns CP and the reference chart 40.

Third Modification

Figure 12:
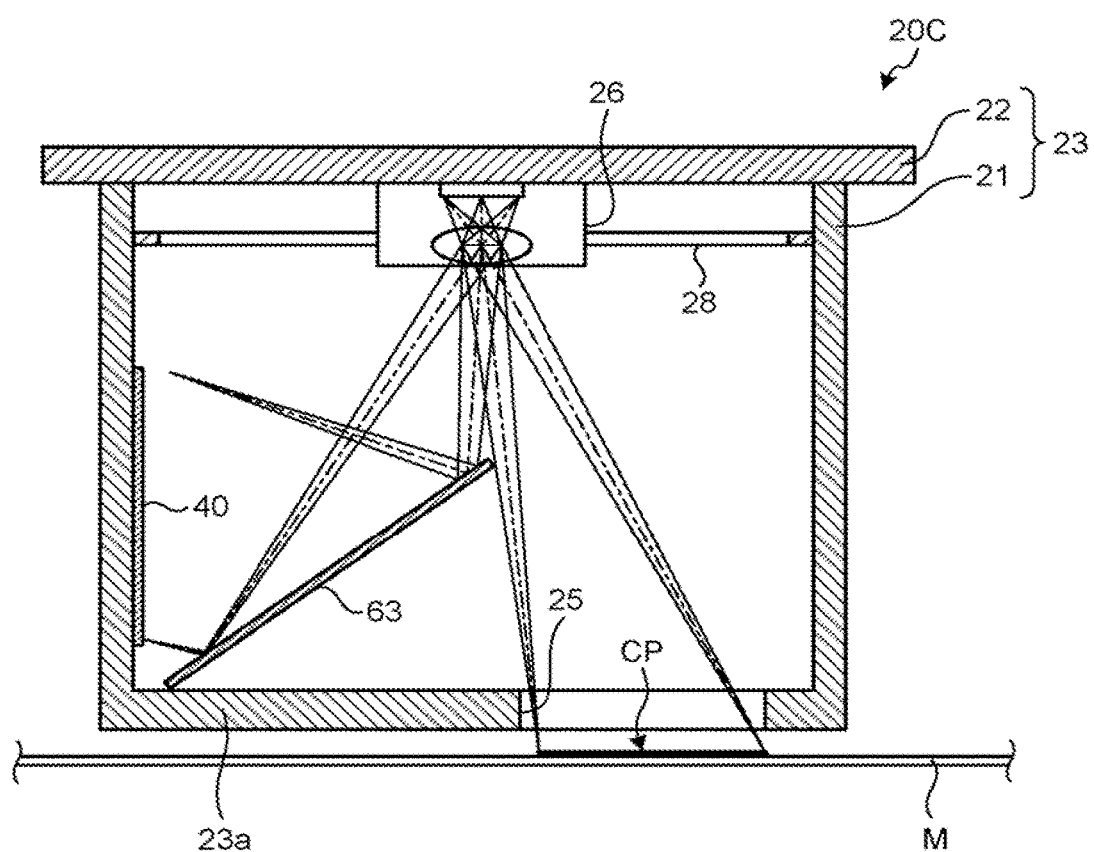
FIG. 12 is a vertical cross-sectional view of a third modification of the color measurement camera.

FIG. 12 is a vertical cross-sectional view of the color measurement camera 20C of the third modification taken along the same line as FIG. 4A which is the vertical cross-sectional view of the color measurement camera 20.

In the color measurement camera 20C of the third modification, the reference chart 40 is arranged on a side surface of the frame body 21 which forms the inner wall of the casing 23. The color measurement camera 20C is configured to cause an optical image of the reference chart 40 to be reflected off a reflecting mirror 63 onto the 2D image sensor 26. Location and mounting angle of the reflecting mirror 63 inside the casing 23 are adjusted such that the optical path length from the 2D image sensor 26 to the reference chart 40 is close to the optical length from the 2D image sensor 26 to the color measurement patterns CP and the difference between the optical path lengths falls within the range of the depth of field of the 2D image sensor 26.

As in the color measurement camera 20 according to the embodiment described above, the light blocking member 28 is arranged outside the image capture area of the 2D image sensor 26 and configured to block light traveling from the illumination light sources 27 toward the specular reflection position in the image capture area of the 2D image sensor 26.

The color measurement camera 20C of the third modification configured as described above causes the optical image of the reference chart 40 to be reflected off the reflecting mirror 63 onto the 2D image sensor 26, thereby bringing the focal plane of the optical image of the color measurement patterns CP closer to the focal plane of the optical image of the reference chart 40. Accordingly, even if the 2D image sensor 26 has a relatively small depth of field, the color measurement camera 20C can capture an appropriate image focused on both the color measurement patterns CP and the reference chart 40.

Fourth Modification

Figure 13A:
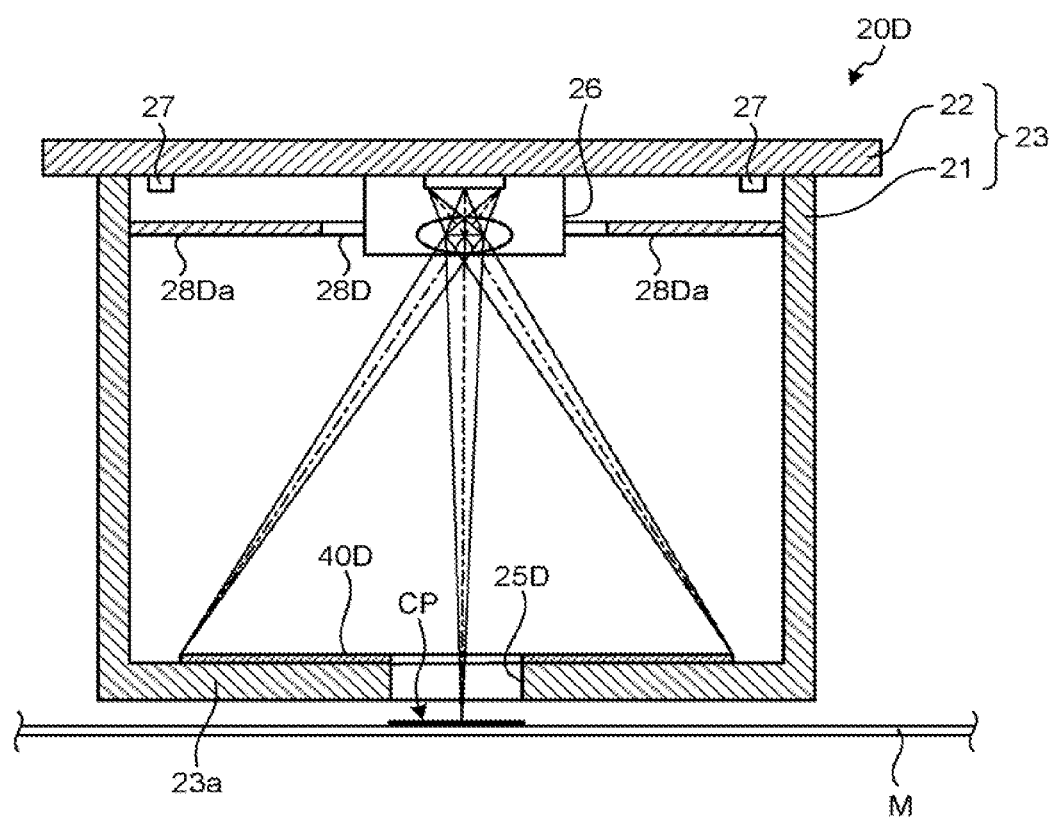
FIG. 13A is a vertical cross-sectional view (cross-sectional view taken along line X3-X3 in FIG. 13B) of a fourth modification of the color measurement camera.
Figure 13B:
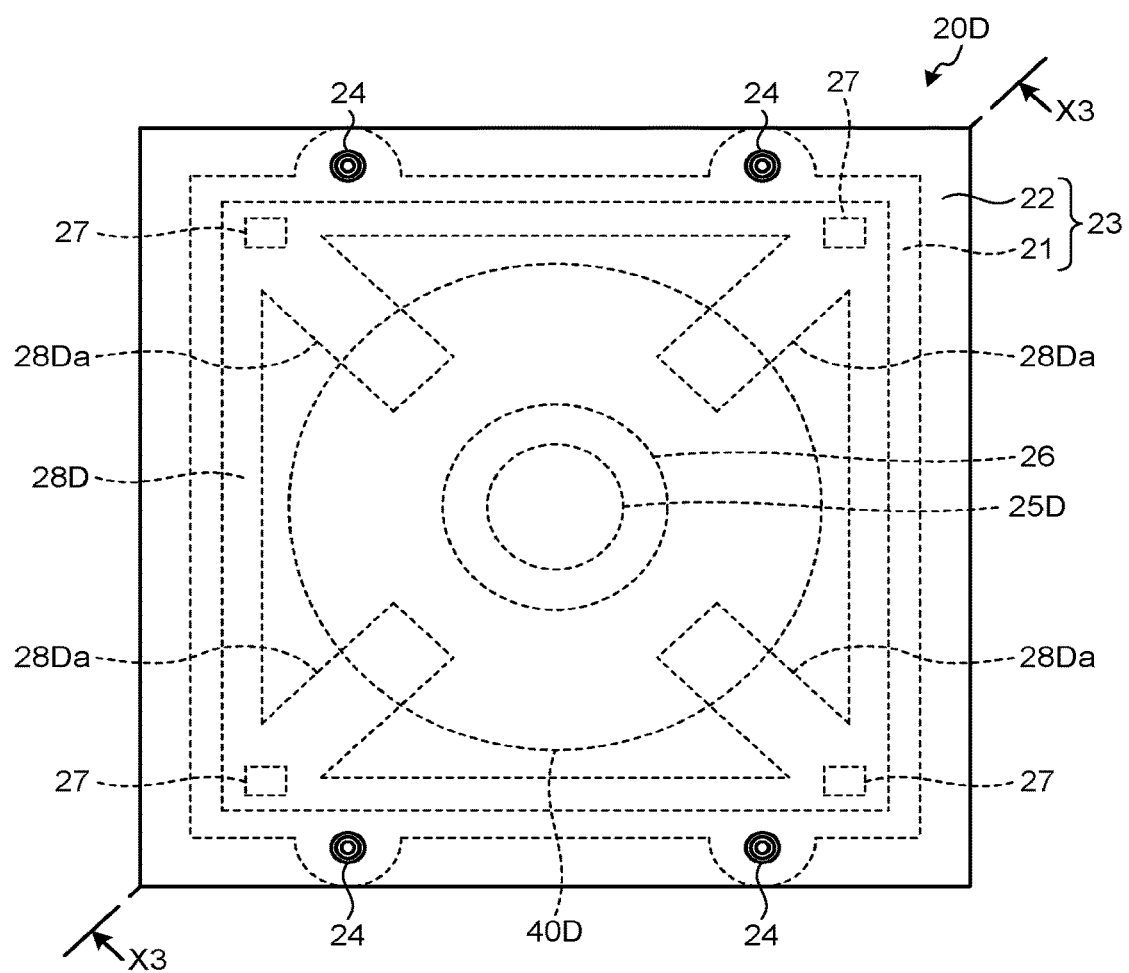
FIG. 13B is a top view transparently illustrating interior of the casing of the fourth modification of the color measurement camera.

FIG. 13A is a vertical cross-sectional view (cross-sectional view taken along line X3-X3 in FIG. 13B) of the color measurement camera 20D of the fourth modification. FIG. 13B is a top view transparently illustrating interior of the casing 23 of the color measurement camera D of the fourth modification.

The color measurement camera 20D of the fourth modification has, in the bottom portion 23a of the casing 23, an opening 25D at a position where the optical axis of the 2D image sensor 26 runs. The 2D image sensor 26 captures an image of the color measurement patterns CP outside the casing 23 through the opening 25D. More specifically, in the color measurement camera 20D of the fourth modification, the opening 25D, through which an image of the color measurement patterns CP outside the casing 23 is to be captured, is arranged at approximately center of the image capture area of the 2D image sensor 26.

In the color measurement camera 20D of the fourth modification, an annular reference chart 40D is arranged surrounding the opening 25D. Accordingly, the annular reference chart 40D is arranged inside the casing 23 so as to externally surround the color measurement patterns CP, so that the 2D image sensor 26 captures an image of the color measurement patterns CP together with the reference chart 40D.

The color measurement camera 20D of the fourth modification uses, as the illumination light sources 27, four LEDs mounted on the inner surface of the circuit board 22 where the 2D image sensor 26 is also mounted, for example. As illustrated in FIG. 13B, the four LEDs used as the illumination light sources 27 are arranged outside the reference chart 40D evenly in the plan view of the image capture area of the 2D image sensor 26 as viewed along the optical axis direction of the 2D image sensor 26. When the four LEDs used as the illumination light sources 27 are arranged in this manner, the color measurement patterns CP and the reference chart 40 can be illuminated under substantially the same conditions.

Furthermore, in the color measurement camera 20D of the fourth modification, a light blocking member 28D including four light blocking pieces 28Da, each corresponding to one of the four LEDs used as the illumination light sources 27, is arranged inside the casing 23 at a position outside the image capture area of the 2D image sensor 26. The four light blocking pieces 28Da of the light blocking member 28D may be joined via the same rectangular frame that conforms to the plane shape of the inner wall of the casing 23 as illustrated in FIG. 13B, for example. Each of the light blocking pieces 28Da is shaped to protrude toward the 2D image sensor 26 from one of the four corners, where the illumination light sources 27 are arranged, of the casing 23. The light blocking member 28D is arranged at a position closer to the reference chart 40D in the optical axis direction of the 2D image sensor 26 than positions of the illumination light sources 27 are.

As does the light blocking member 28 described above, the light blocking member 28D included in the color measurement camera 20D of the fourth modification blocks light traveling from the illumination light sources 27 toward the specular reflection position in the image capture area of the 2D image sensor 26 with the light blocking pieces 28Da.

In the color measurement camera 20D of the fourth modification configured as described above, the opening 25D, through which an image of the color measurement patterns CP outside the casing 23 is to be captured, is arranged at the position through which the optical axis of the 2D image sensor 26 runs. Furthermore, the annular reference chart 40D is arranged surrounding the opening 25D. Accordingly, even if the angle of view of the 2D image sensor 26 is small and therefore the image capture area is limited, the color measurement camera 20D can capture an image of the color measurement patterns CP and the reference chart 40D appropriately.

Other Modifications

In the embodiment described above, the image forming apparatus 100 is embodied in a serial-head inkjet printer. However, conceivable embodiments of the present invention are not limited to the examples described above, and the invention may be effectively embodied in a wide variety of image forming apparatuses. For example, when the present invention is embodied in a line-head inkjet printer, a plurality of the color measurement cameras 20 may be arranged in the direction perpendicular to the conveying direction of the recording medium M. For another example, when the present invention is embodied in an electrophotographic image forming apparatus, a plurality of the color measurement cameras 20 may be arranged in the direction perpendicular to the conveying direction of the recording medium M in at least any position on a conveyance path of the recording medium M after fixing.

In the embodiment described above, the color measurement camera 20 is configured to provide the function of calculating color measurement values of the color measurement patterns CP. Alternatively, the color measurement values of the color measurement patterns CP may be calculated in the exterior of the color measurement camera 20. For example, the CPU 101 or the control FPGA 110 mounted on the main-control circuit board 120 of the image forming apparatus 100 may be configured to calculate the color measurement values of the color measurement patterns CP. To implement this configuration, the color measurement camera 20 may be configured to send RGB values of the color measurement patterns CP and the reference chart 40, rather than the color measurement values of the color measurement patterns CP, to the CPU 101 or the control FPGA 110. In short, the color measurement camera 20 may be configured as an image capturing device that does not have the function of calculating color measurement values.

In the embodiment described above, the color measurement camera 20 moves above the recording medium M where the color measurement patterns CP are formed by utilizing the mechanism of the image forming apparatus 100. Alternatively, the color measurement camera 20 may be separated from the image forming apparatus 100 and configured to move above the recording medium M where the color measurement patterns CP are formed, by using a moving mechanism of its own. In short, while the embodiment described above is an example in which the image forming apparatus 100 provides the function as a color measurement apparatus, a color measurement apparatus may be configured as an apparatus independent of the image forming apparatus 100 and calculate the color measurement values of the color measurement patterns CP formed by the image forming apparatus 100.

Figure 14:
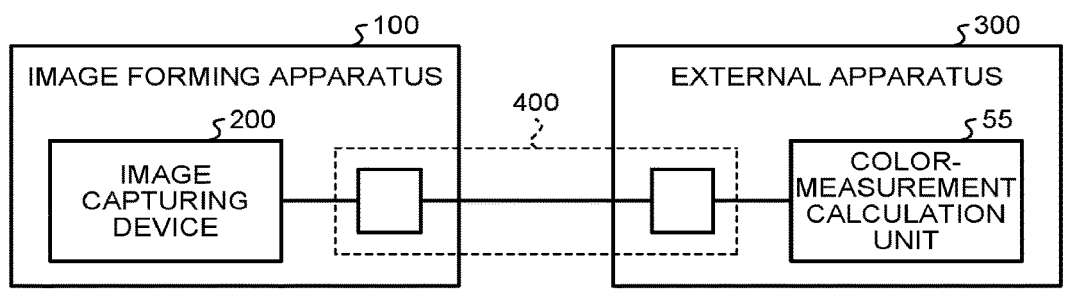
FIG. 14 is a diagram schematically illustrating a configuration of a color measurement system.

In the embodiment described above, the image forming apparatus 100 including the color measurement camera 20 is configured to provide the function of calculating the color measurement values of the color measurement patterns CP. However, calculation of the color measurement values of the color measurement patterns CP is not necessarily performed in the image forming apparatus 100. For example, as illustrated in FIG. 14, an image forming system (color measurement system) where the image forming apparatus 100 and an external apparatus 300 are communicably connected may be constructed so that calculation of the color measurement values is performed by the external apparatus 300 by causing the external apparatus 300 to provide the function of the color-measurement calculation unit 55 of calculating the color measurement values of the color measurement patterns CP. Hence, the color measurement system is made up of an image capturing device 200 (which is configured to provide the function of the color measurement camera 20 described above excluding the function of the color-measurement calculation unit 55) included in the image forming apparatus 100, the color-measurement calculation unit 55 included in the external apparatus 300, and a communication unit 400 that connects the image capturing device 200 and the color-measurement calculation unit 55 (the image forming apparatus 100 and the external apparatus 300). As the external apparatus 300, a computer called a DFE (digital front end) may be used, for example. Examples of communications utilized by the communication unit 400 include wired or wireless P2P (Peer to Peer) communication and network communication via a LAN (local area network), the Internet, or the like.

To implement the configuration described above, for example, the image forming apparatus 100 transmits RGB values of the color measurement patterns CP and RGB values of the respective reference patches of the reference chart 40 obtained from an image captured by the image capturing device 200 to the external apparatus 300 by utilizing the communication unit 400. The external apparatus 300 calculates color measurement values of the color measurement patterns CP based on the RGB values of the color measurement patterns CP and the RGB values of the respective reference patches of the reference chart 40 received from the image forming apparatus 100, and creates or corrects a device profile that describes the characteristics of the image forming apparatus 100 based on the obtained color measurement values. The external apparatus 300 transmits the device profile to the image forming apparatus 100 by utilizing the communication unit 400. The image forming apparatus 100 stores the device profile received from the external apparatus 300 and, when performing image forming, corrects image data based on the device profile and forms an image in accordance with the corrected image data. Thus, the imaging apparatus 100 can form an image with high reproducibility.

Alternatively, the external apparatus 300 may be configured to hold the device profile of the image forming apparatus 100 created based on the color measurement values of the color measurement patterns CP and correct image data. More specifically, when performing image forming, the image forming apparatus 100 transmits image data to the external apparatus 300. The external apparatus 300 corrects the image data received from the image forming apparatus 100 based on the device profile held in the external apparatus 300 and transmits the corrected image data to the image forming apparatus 100. The image forming apparatus 100 forms an image in accordance with the corrected image data received from the external apparatus 300. Thus, the imaging apparatus 100 can form an image with high reproducibility.

Alternatively, the image forming apparatus 100 may transmit, in lieu of RGB values of the color measurement patterns CP and RGB values of the respective reference patches of the reference chart 40, a captured image captured by the image capturing device 200 to the external apparatus 300. In this case, the external apparatus 300 calculates RGB values of the color measurement patterns CP and RGB values of the respective reference patches of the reference chart 40 from the captured image received from the image forming apparatus 100, and calculates color measurement values of the color measurement patterns CP from the obtained RGB values.

The control functions of the units included in the image forming apparatus 100 and the color measurement camera 20 (the image capturing device 200) according to the embodiment described above may be implemented in hardware, software, or a combination of hardware and software. To implement the control functions of the units of the image forming apparatus 100 and the color measurement camera 20 in software, a processor included in the image forming apparatus 100 or the color measurement camera 20 (the image capturing device 200) executes a program describing processing sequences. The program to be executed by the processor may be provided by being stored in a ROM or the like in the image forming apparatus 100 or the color measurement camera 20 in advance. The program to be executed by the processor may be provided as being recorded in a computer-readable recording medium such as a CD-ROM (compact disc read-only memory), an FD (flexible disk), a CD-R (compact disc recordable), or a DVD (digital versatile disk) in an installable or executable format.

The program to be executed by the processor may be stored on a computer connected to a network such as the Internet and provided by being downloaded via the network. The program to be executed by the processor may be configured to be provided or distributed via a network such as the Internet.

According to an embodiment, an effect that light specularly reflected off a subject is prevented from impinging on a 2D image sensor is yielded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing device, comprising:
   a two-dimensional image sensor that captures an image of a predetermined image capture area including a subject;
   a light source that illuminates the image capture area; and
   a light blocking member that blocks light traveling from the light source toward a specular reflection position, the specular reflection position being a position that is in the image capture area and where, if light travels from the light source, the light would be specularly reflected to the two-dimensional image sensor, wherein
   the light blocking member is arranged outside the image capture area, and
   the light blocking member is arranged at a position overlapping with the light source as viewed along an optical axis direction of the two-dimensional image sensor.

2. The image capturing device according to claim 1, further comprising
   a reference chart arranged away from a position of the subject by a predetermined distance and in the image capture area, an image of the reference chart being captured together with an image of the subject by the two-dimensional image sensor,
   wherein the light source is arranged overlapping with an intermediate area between the subject and the reference chart in a plan view of the image capture area as viewed along the optical axis direction of the two-dimensional image sensor, and
   a vertical position of the light blocking member is closer to the intermediate area in the optical axis direction of the two-dimensional image sensor than a position of the light source is.

3. The image capturing device according to claim 1, further comprising
   an annular reference chart arranged in the image capture area so as to externally surround a position of the subject, an image of the annular reference chart being captured together with an image of the subject by the two-dimensional image sensor,
   wherein the light source includes a plurality of light sources arranged outside the annular reference chart evenly in a plan view of the image capture area as viewed along the optical axis direction of the two-dimensional image sensor, and
   the light blocking member is arranged closer to the annular reference chart in the optical axis direction of the two-dimensional image sensor than positions of the light sources are.

4. The image capturing device according to claim 1, wherein the light blocking member has a surface that absorbs or attenuates light traveling from the light source.

5. A color measurement apparatus, comprising:
   the image capturing device according to claim 1; and
   processing circuitry that calculates a color measurement value of the subject based on image data of an image of the subject captured by the two-dimensional image sensor.

6. An image forming apparatus, comprising:
   the color measurement apparatus according to claim 5; and
   an image forming device, including print heads, that forms an image on a recording medium using coloring material, wherein
   the subject is an image formed by the image forming device on the recording medium.

7. The image capturing device of claim 1, wherein the light source includes two light sources and the light blocking member includes a rectangular frame and two convex light blocking portions attached to a central portion of the rectangular frame, each light blocking portion overlapping with one of the two light sources as viewed along the optical axis direction of the two-dimensional image sensor.

8. The image capturing device of claim 1, wherein the light blocking member is fixed to an inner wall of a casing of the image capturing device.

9. The image capturing device of claim 1, wherein the light blocking member is arranged below the light source as viewed along the optical axis direction of the two-dimensional image sensor.

* * * * *